United States Patent
Chiu et al.

(10) Patent No.: US 11,313,684 B2
(45) Date of Patent: Apr. 26, 2022

(54) COLLABORATIVE NAVIGATION AND MAPPING

(71) Applicant: SRI INTERNATIONAL, Menlo Park, CA (US)

(72) Inventors: Han-Pang Chiu, Princeton, NJ (US); Supun Samarasekera, Skillman, NJ (US); Rakesh Kumar, West Windsor, NJ (US); Mikhail Sizintsev, Princeton, NJ (US); Xun Zhou, Pennington, NJ (US); Philip Miller, Yardley, PA (US); Glenn Murray, Jamison, PA (US)

(73) Assignee: SRI International, Menlo Park, CA (US)

(*) Notice: Subject to any disclaimer, the term of this patent is extended or adjusted under 35 U.S.C. 154(b) by 252 days.

(21) Appl. No.: 16/089,322

(22) PCT Filed: Mar. 28, 2017

(86) PCT No.: PCT/US2017/024554
§ 371 (c)(1),
(2) Date: Sep. 27, 2018

(87) PCT Pub. No.: WO2017/172778
PCT Pub. Date: Oct. 5, 2017

(65) Prior Publication Data
US 2020/0300637 A1     Sep. 24, 2020

Related U.S. Application Data

(60) Provisional application No. 62/314,203, filed on Mar. 28, 2016.

(51) Int. Cl.
*G01C 21/32* (2006.01)
*G01C 21/34* (2006.01)
(Continued)

(52) U.S. Cl.
CPC ......... *G01C 21/32* (2013.01); *G01C 21/3476* (2013.01); *G06K 9/6232* (2013.01);
(Continued)

(58) Field of Classification Search
CPC .. G01C 21/32; G01C 21/3476; G06K 9/6214; G06K 9/00664; G06K 9/6232; H04W 4/021
See application file for complete search history.

(56) References Cited

U.S. PATENT DOCUMENTS 8,260,036 B2 * 9/2012 Hamza .................... G06T 7/285
                                                                382/154
8,761,439 B1    6/2014 Kumar et al.
(Continued)

FOREIGN PATENT DOCUMENTS

KR   10-2015-0088636 A   8/2015

OTHER PUBLICATIONS

International Search Report and Written Opinion dated May 31, 2017 for PCT Application No. PCT/US2017/024554.

*Primary Examiner* — Jeff A Burke
*Assistant Examiner* — Kyle T Johnson
(74) *Attorney, Agent, or Firm* — Moser Taboada

(57) ABSTRACT

During GPS-denied/restricted navigation, images proximate a platform device are captured using a camera, and corresponding motion measurements of the platform device are captured using an IMU device. Features of a current frame of the images captured are extracted. Extracted features are matched and feature information between consecutive frames is tracked. The extracted features are compared to previously stored, geo-referenced visual features from a plurality of platform devices. If one of the extracted features does not match a geo-referenced visual feature, a pose is determined for the platform device using IMU measure- (Continued)

ments propagated from a previous pose and relative motion information between consecutive frames, which is determined using the tracked feature information. If at least one of the extracted features matches a geo-referenced visual feature, a pose is determined for the platform device using location information associated with the matched, geo-referenced visual feature and relative motion information between consecutive frames.

15 Claims, 7 Drawing Sheets

(51) Int. Cl.
    *G06V 10/75*     (2022.01)
    *G06V 20/10*     (2022.01)
    *G06K 9/62*     (2022.01)
    *H04W 4/021*     (2018.01)

(52) U.S. Cl.
    CPC ............ *G06V 10/76* (2022.01); *G06V 20/10* (2022.01); *H04W 4/021* (2013.01)

(56) References Cited

U.S. PATENT DOCUMENTS

| | | | |
|---|---|---|---|
| 9,031,809 B1 | 5/2015 | Kumar et al. | |
| 9,215,560 B1* | 12/2015 | Jernigan | H04W 4/021 |
| 9,683,832 B2* | 6/2017 | Wang | G01S 19/51 |
| 10,775,175 B1* | 9/2020 | Bendickson | G01S 17/10 |
| 2010/0092071 A1* | 4/2010 | Susca | G06T 7/33 |
| | | | 382/154 |
| 2012/0078510 A1* | 3/2012 | Ma | G05D 1/027 |
| | | | 701/426 |
| 2012/0081248 A1* | 4/2012 | Kennedy | G01S 5/0289 |
| | | | 342/118 |
| 2012/0121161 A1* | 5/2012 | Eade | G05D 1/0253 |
| | | | 382/153 |
| 2013/0101159 A1* | 4/2013 | Chao | G06K 9/00771 |
| | | | 382/103 |
| 2013/0127980 A1* | 5/2013 | Haddick | G02B 27/0093 |
| | | | 348/14.08 |
| 2013/0131981 A1* | 5/2013 | Hawkinson | G01C 21/165 |
| | | | 701/468 |
| 2015/0094089 A1* | 4/2015 | Moeglein | G01S 5/16 |
| | | | 455/456.1 |
| 2015/0190925 A1* | 7/2015 | Hoffman | B25J 9/1671 |
| | | | 700/257 |
| 2015/0213617 A1* | 7/2015 | Kim | G06K 9/00798 |
| | | | 382/103 |
| 2015/0268058 A1* | 9/2015 | Samarasekera | G08G 5/0073 |
| | | | 701/409 |
| 2016/0005164 A1* | 1/2016 | Roumeliotis | G01C 21/16 |
| | | | 348/116 |
| 2016/0078303 A1 | 3/2016 | Samarasekera et al. | |
| 2016/0327395 A1* | 11/2016 | Roumeliotis | G05D 1/0274 |
| 2016/0379074 A1* | 12/2016 | Nielsen | H04N 7/181 |
| | | | 348/143 |
| 2017/0012812 A1* | 1/2017 | Gotoh | H04L 41/046 |
| 2017/0343356 A1* | 11/2017 | Roumeliotis | G01C 21/32 |
| 2018/0144476 A1* | 5/2018 | Smith | G06T 3/40 |
| 2018/0190014 A1* | 7/2018 | Yarborough | G01S 7/4808 |
| 2019/0095745 A1* | 3/2019 | Bao | G06K 9/4604 |
| 2019/0234746 A1* | 8/2019 | Zhang | G01C 21/16 |
| 2020/0218253 A1* | 7/2020 | Ramamurthy | B60W 60/001 |
| 2020/0300637 A1* | 9/2020 | Chiu | G05D 1/0253 |

* cited by examiner

| Sensor | Platform | Type of Information | Benefit |
|---|---|---|---|
| IMU | All | Relative Location and Orientation | Key sensor for providing continuous, low-latency estimates of navigation state. High-samplingrates and high bandwidth |
| | All | Zero velocity constraints and motion patterns | Estimation of step size and behavior state of platform: sitting, running, crouching, crawling etc |
| GPS | All | Absolution Location | Key sensor for providing absolute location |
| GPS pseudo-range | All | Absolution Location | Key sensor can bound drift even if a few satellites are visible |
| Odometer | UGV | Relative Location | Can bound drift of IMU-based measurements |
| Cameras (EO and LWIR mono. cameras for day and night) | All | Relative Location and Orientation (2D-3D tracks) | Can bound drift and be used to build map of the world to enable loop closures for revisited areas |
| | | Absolute Location and Orientation (2D-3D points) | Corrects drift for location and orientation, using vision-based matching to landmarks and geo-registration of video to aerial imagery/site models. Critical for high accuracy when GPS is lost |
| Stereo Cameras | UGV | Relative / Absolute Location and Orientation | Key sensor for detecting depth for obstacle avoidance. Also very good for location and orientation estimation |
| RF Ranging | All | Absolute Location | Can bound drift. Can be used while ranging to fixed nodes of known positions to improve navigation results |
| Barometer | All | Absolute Height | Key for bounding vertical drift over hilly terrain and for UAV |
| Magnetometer | All | Absolute Orientation | Can bound drift |

FIG. 2

COLLABORATIVE NAVIGATION AND MAPPING

GOVERNMENT RIGHTS

This invention was made with government support under contract no. FA8650-13-C-7322 awarded by the United States Air Force and contract no. W911NF-15-C-0053 awarded by the United States Army. The Government has certain rights in this invention.

BACKGROUND

Previous navigation approaches for multiple platforms lack the capability to accurately localize their positions in GPS-denied environments. The localization error grows over time, which hinders situation awareness or collaborative tasks which require accurate location information about each other.

SUMMARY

Embodiments of the present principles generally relate to methods, apparatuses and systems for collaborative navigation and mapping.

A collaborative navigation and mapping subsystem for determining a pose of a platform device includes one or more non-transitory machine accessible storage media and includes instructions executable by one or more processors to cause a computing system to construct a map of 2D and 3D geo-referenced visual features associated with IMU tracking data for respective images captured by a plurality of platform devices. During GPS-denied or GPS-restricted navigation, the collaborative navigation and mapping subsystem causes the computing system to capture images proximate the platform device using a camera and capture corresponding motion measurements of the platform device using an IMU device, extract features of a current frame of the images captured by the camera, match features and track feature information between a previous frame and the current frame of the images captured by the camera and compare the extracted features to the stored geo-referenced visual features. If at least one of the extracted features does not match a stored geo-referenced visual feature, a pose for the platform device is determined using IMU measurements propagated from a previous pose of the platform device and relative motion information between the previous frame and the current frame of the images captured by the camera, determined using the tracked feature information. If at least one of the extracted features matches a stored geo-referenced visual feature, a pose for the platform device is determined using location information associated with the matched, geo-referenced visual feature and relative motion information between the previous frame and the current frame of the images captured by the camera determined using the tracked feature information.

A collaborative localization system includes a plurality of platform devices, each of the platform devices includes a data radio to share visual feature and pose information among at least two of the plurality of platform devices, a camera to capture images associated with a location of the platform device, a GPS to capture position information of the platform device, an IMU to capture motion information of the platform device, and a collaborative navigation and mapping subsystem. The collaborative navigation and mapping subsystem includes one or more non-transitory machine accessible storage media and instructions executable by one or more processors to cause a computing system to construct a map of 2D and 3D geo-referenced visual features associated with IMU tracking data for respective images captured by the plurality of platform devices. During GPS-denied or GPS-restricted navigation, the collaborative navigation and mapping subsystem causes the computing system to capture images associated with a location of the platform device using a camera and capture corresponding motion measurements of the platform device using an IMU device, extract features of a current frame of the images captured by the camera, match features and track feature information between a previous frame and the current frame of the images captured by the camera, and compare the extracted features to the stored geo-referenced visual features. If at least one of the extracted features does not match a stored geo-referenced visual feature, a pose for the platform device is determined using IMU measurements propagated from a previous pose of the platform device and relative motion information between the previous frame and the current frame of the images captured by the camera, determined using the tracked feature information. If at least one of the extracted features matches a stored geo-referenced visual feature, a pose for the platform device is determined using location information associated with the matched, geo-referenced visual feature and relative motion information between the previous frame and the current frame of the images captured by the camera determined using the tracked feature information.

A method for determining a pose of a platform device includes constructing a map of 2D and 3D geo-referenced visual features associated with IMU tracking data for respective images captured by a plurality of platform devices. During GPS-denied or GPS-restricted navigation, the method includes capturing images proximate the platform device using a camera and capturing corresponding motion measurements using an IMU device, extracting features of a current frame of the images captured by the camera, matching features and tracking feature information between a previous frame and the current frame of the images captured by the camera, and comparing the extracted features to the stored geo-referenced visual features. If at least one of the extracted features does not match a stored geo-referenced visual feature, a pose for the platform device is determined using IMU measurements propagated from a previous pose of the platform device and relative motion information between the previous frame and the current frame of the images captured by the camera, determined using the tracked feature information. If at least one of the extracted features matches a stored geo-referenced visual feature, a pose for the platform device is determined using location information associated with the matched, geo-referenced visual feature and relative motion information between the previous frame and the current frame of the images captured by the camera determined using the tracked feature information.

A method for determining a pose of a platform device includes during GPS-denied or GPS-restricted navigation, capturing images proximate the platform device using a camera and capturing corresponding motion measurements of the platform device using an IMU device, extracting features of a current frame of the images captured by the camera, matching features and tracking feature information between a previous frame and the current frame of the images captured by the camera, and comparing the extracted features to previously stored, geo-referenced visual features from a plurality of platform devices. If at least one of the extracted features does not match a stored, geo-referenced visual feature, a pose for the platform device is determined using IMU measurements propagated from a previous pose of the platform device and relative motion information between the previous frame and the current frame of the images captured by the camera determined using the tracked feature information. If at least one of the extracted features matches a stored geo-referenced visual feature, a pose for the platform device is determined using location information associated with the matched, geo-referenced visual feature and relative motion information between the previous frame and the current frame of the images captured by the camera determined using the tracked feature information. In such an embodiment the previously stored geo-referenced visual features from a plurality of platform devices can comprise a map.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 2 depicts a Table listing exemplary sensors capable of being implemented for the different platforms in the CLS of FIG. 1 in accordance with an embodiment of the present principles

Figure 1:
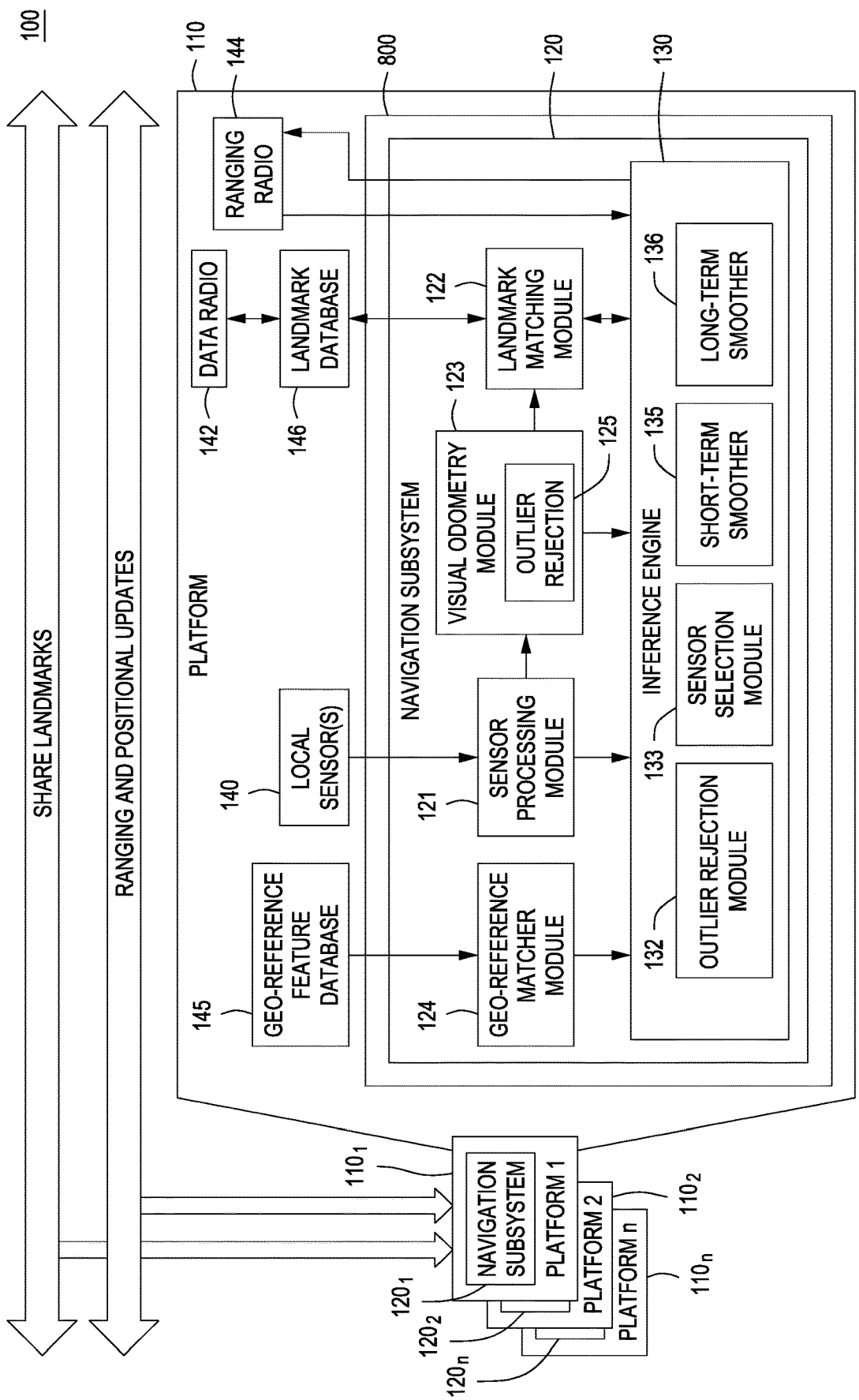
FIG. 1 depicts a high level block diagram of a Collaborative Localization System (CLS) in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for collaborative navigation and mapping. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to ground navigation, such teachings should not be considered limiting. Embodiments in accordance with the present principles can be applied to aerial navigation and other such concepts as described herein.

Embodiments in accordance with the present principles are directed at an innovative Collaborative Localization System (CLS) for improving individual and collective localization and pose accuracy by using multi-modal shared information from distributed multiple platforms. In some embodiments, collaboration occurs organically without any special behaviors across multiple platforms in real-time, with distributed asynchronous, opportunistic information sharing. Embodiments of a CLS in accordance with the present principles can be packaged into a low Size, Weight and Power (SWaP) module. It should be noted that throughout the teachings herein, the terms landmark(s) and feature(s) may be used interchangeably.

Supporting information useful for understating the determination of pose estimations in accordance with the present principles can be found in commonly owned U.S. Pat. No. 8,761,439 entitled "Method and apparatus for generating three-dimensional pose using monocular visual sensor and inertial measurement unit" and commonly owned U.S. Pat. No. 9,031,809, entitled "Method and apparatus for generating three-dimensional pose using multi-modal sensor fusion" the teachings of which are both incorporated herein by reference in their entireties.

Figure 8:
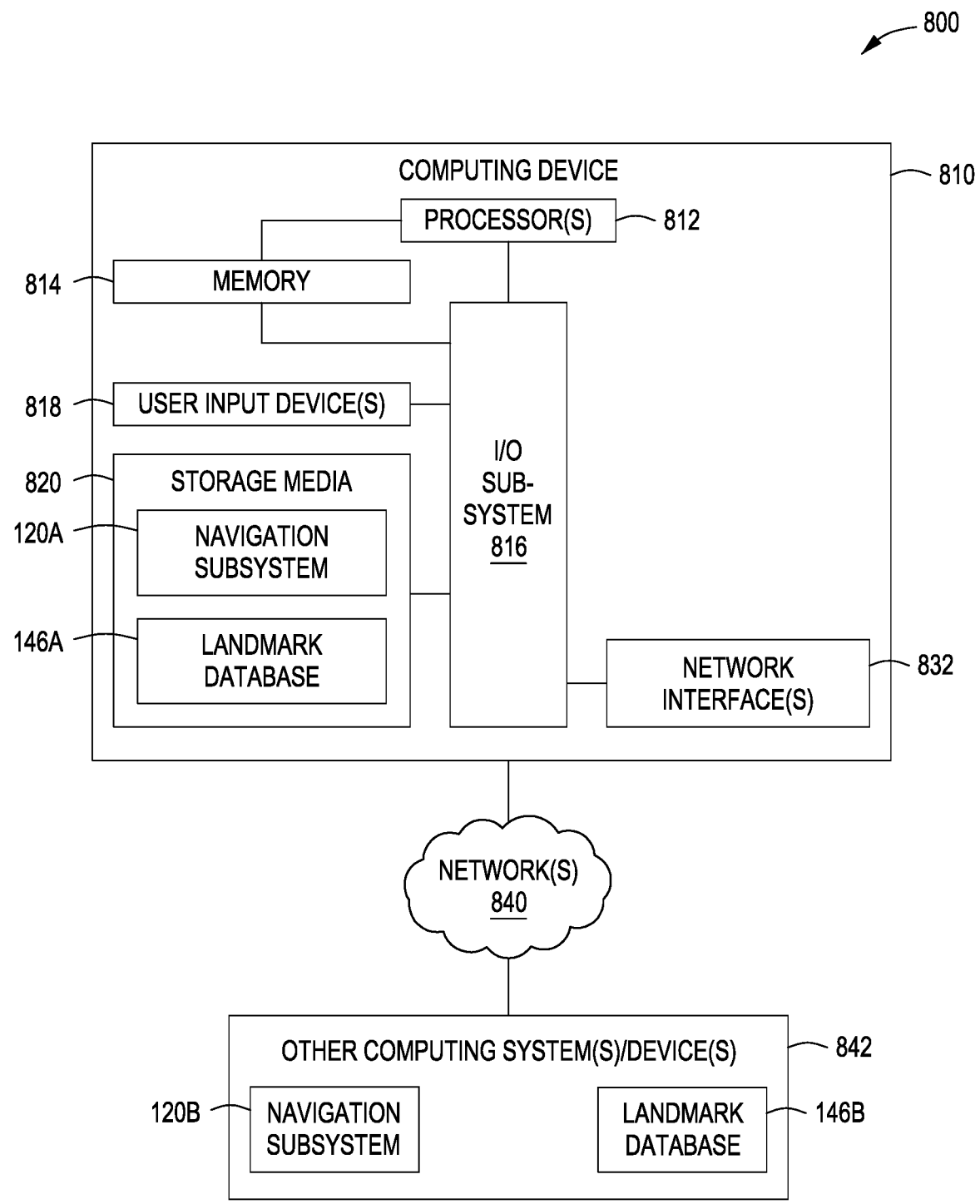
FIG. 8 depicts a simplified high level block diagram of an embodiment of the computing device 800 in which a navigation subsystem 120 can be implemented in accordance with an embodiment of the present principles.

FIG. 1 depicts a high level block diagram of a Collaborative Localization System (CLS) 100 in accordance with an embodiment of the present principles. The CLS 100 of FIG. 1, illustratively comprises a plurality of platforms $110_1$-$110_n$, collectively platforms 110, each of the platforms 110 comprising a respective navigation subsystem $120_1$-$120_n$, collectively navigation subsystems 120. In some embodiments, the plurality of platforms 110 for collaborative navigation in accordance with the present principles can include, for example, at least one of or a combination of humans, cars, robots, and drones. Each of the navigation subsystems 120 of the CLS 100 of FIG. 1, as illustrated, can be embodied in a computing device 800, an example of which is shown in FIG. 8, described below. In FIG. 1, an embodiment of the navigation subsystem 120 is shown in the context of an environment that can be created during the operation of the navigation subsystem 120 (e.g., a physical and/or virtual execution or "runtime" environment). The illustrative navigation subsystem 120 is embodied as a number of machine-readable instructions, modules, data structures and/or other components, which can be implemented as computer hardware, firmware, software, or a combination thereof.

Each of the navigation subsystems 120 of FIG. 1 illustratively comprises at least a sensor processing module 121, a landmark matching module 122, a visual odometry module 123, an inference engine 130 and an optional geo-reference matcher module 124. The visual odometry module 123 of the navigation subsystems 120 of FIG. 1 illustratively comprises an outlier rejection module 125. The inference engine 130 of the navigation subsystems 120 of FIG. 1 illustratively comprises an outlier rejection module 132, a sensor selection module 133, a short-term smoother and 135 and a long-term smoother 136.

Each of the platforms 110 of the CLS 100 of FIG. 1 further includes at least one local sensor, collectively sensors 140, a data radio 142, an optional ranging radio 144, an optional geo-reference feature database 145, and a landmark database 146. In the platform 110 of the CLS 100 depicted in FIG. 1, the inference engine 130 of the navigation system 120 receives measurements (or constraints) from different processing modules or sensors. For example, measurements from local sensors 140 can be communicated to the inference engine 130 to be used by the inference engine 130 for determining pose estimations. Simple sensors such as IMU, GPS, and magnetometer require no pre-processing, and measurements from such sensors can be communicated directly to the inference engine 130 without pre-processing. Sensors such as an EO/IR camera are pre-processed by, for example, the sensor processing module 121, to generate features that are tracked over time, and these tracked features become the measurements for the inference engine 130.

In the platform 110 of the CLS 100 depicted in FIG. 1, different designs for placements of the sensors 140 in the platform 110 are considered to increase the chances of receiving high-quality measurements in different situations. For example, for a crawl and/or crouch position, it can be better to point cameras at different directions than normal to perceive scene features. Real-time machine learning techniques can be applied to classify human behaviors (e.g., such as stationary or running) based on IMU data. Such technique provides additional constraints, such as zero-velocity constraints for stationary periods, step constraints, etc., to optimize navigation state estimates.

FIG. 2 depicts a Table listing exemplary sensors capable of being implemented for the different platforms 110 in the CLS 100 of FIG. 1 in accordance with an embodiment of the present principles. As depicted in FIG. 2, the information (relative or absolute) from each sensor provides benefits to pose estimation of different platforms. For example, as depicted in FIG. 2, in some embodiments, the CLS 100 can include at least one of a barometer, odometer and magnetometer for providing measurements to, for example, the inference engine 130 for bounding a drift of pose estimations.

In some embodiments, the outlier rejection module 132 of the inference engine 130 evaluates a quality of data from each sensor to its expected performance and to an estimated navigation solution. In some embodiments, the outlier rejection module 132 ensures system robustness by detecting and rejecting outlier measurements using two different consistency checking methods. First a consistency across sensors is established by comparing the residual of the measurement from the value predicted by the current solution state formed by other sensors. Second a consistency among measurements from the same sensor is established. The consistency checks enable the rejection of outlier or corrupted measurements from influencing a navigation solution. Selected measurements are then communicated to the inference module 130.

The sensor selection module 133 of the inference engine 130 considers the quality of the sensor measurements determined by the outlier rejection module 132 and evaluates different combinations of sensor subsets to determine an optimal subset of sensors that should be used at any given time. The sensor selection module 133 automatically selects the sensors to give the best navigation result under resource constraints. In some embodiments, the selection is based on sensor characteristics (such as quality, rate, and data size), computational and power resources, and bandwidth.

In the navigation subsystems 120 of the CLS 100, a map is generated, which stores visual landmarks (features), which consist of 3D estimates (estimated from the inference engine 130) with associated 2D information (position and descriptor from landmark matching module 122). That is, each visual landmark (feature) in the map consists of its absolute 3D coordinate, with its 2D location and visual descriptors from 2D images. Each navigation subsystem 120 in FIG. 1 supports the generation and utilization of the pre-built maps, and is able to achieve highly-accurate sub-meter navigation accuracy under large-scale environments for multiple platforms (e.g., humans, robots, cars, and drones) using pre-mapped visual landmarks. Each navigation subsystem 120 treats each new observation of a pre-mapped visual landmark as a single global measurement. As such, precise 3D global pose estimates are propagated for longer periods in GPS-denied settings, and is more robust when only few or no pre-mapped landmarks are available due to scene occlusion or changes.

To construct a high-quality map of visual landmarks beforehand or on the fly, each platform 110, including respective navigation subsystems 120, of the CLS 100, a platform traverses (e.g., drives) an area and a respective CLS 100 of a platform can use monocular and/or stereo cameras, an IMU, and a high-precision differential GPS to construct a fully optimized map of the area. That is, in some embodiments, a high-quality map of visual features/landmarks of an area can be constructed by moving a platform within the area and using a monocular camera, IMU, and high-precision differential GPS of a respective CLS 100 of the platform to capture respective measurements. Data from the camera, IMU, and high-precision differential GPS are communicated to the inference engine 130 for determining respective poses for the visual features. In some embodiments, data from at least the monocular camera is pre-processed to extract meaningful measurements for the inference engine 130. For example and with reference to FIG. 1, measurements from the monocular camera 140 is pre-processed by the sensor processing module 121.

Figure 3:
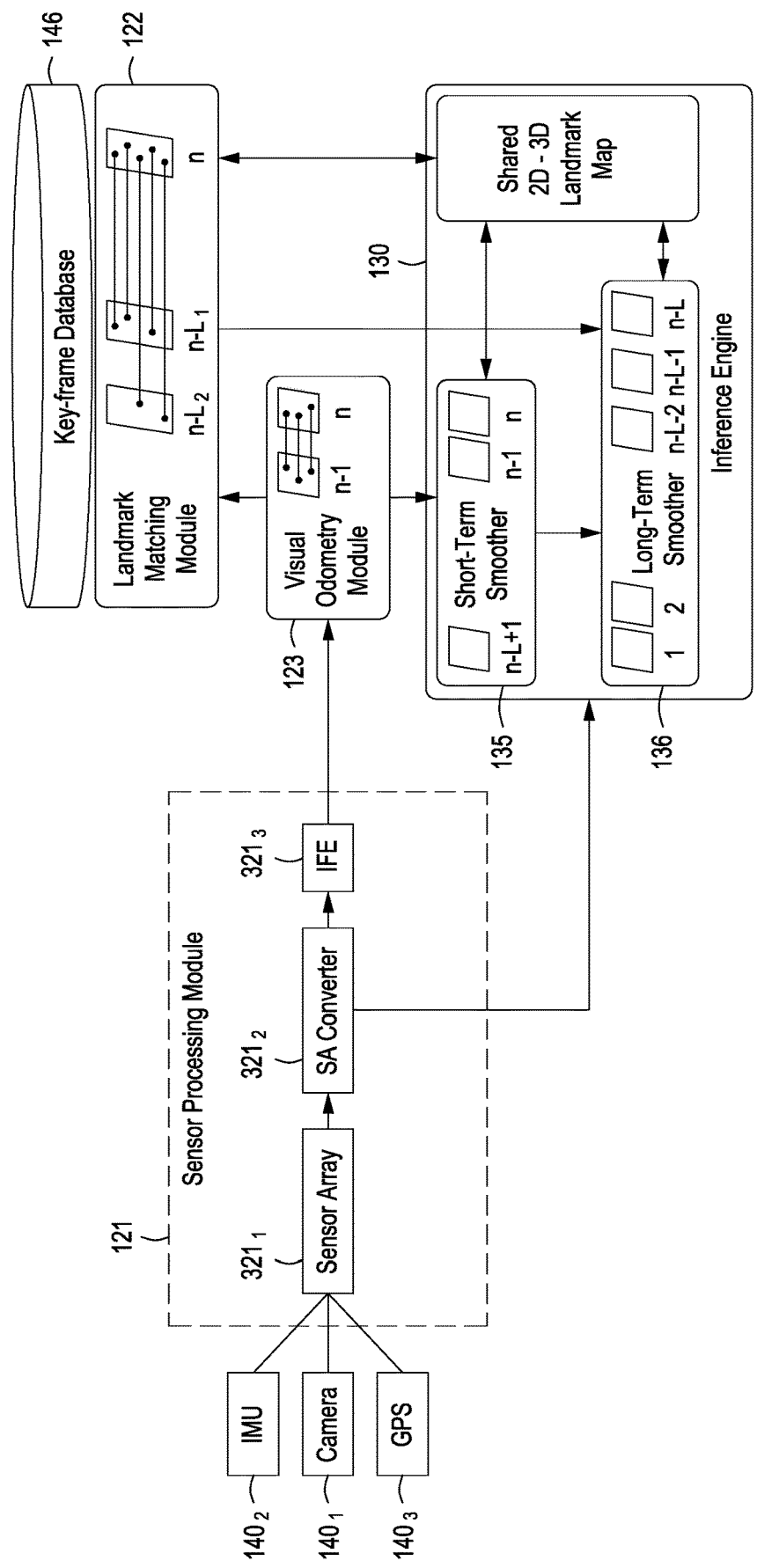
FIG. 3 depicts a functional block diagram of a mapping portion of a localization and mapping process (simultaneous localization and mapping: SLAM:) capable of being implemented by each of the platforms of the CLS of FIG. 1 in accordance with an embodiment of the present principles.

FIG. 3 depicts a functional block diagram of a mapping portion of a simultaneous localization and mapping process capable of being implemented by each of the platforms 110 of the CLS 100 of FIG. 1 in accordance with an embodiment of the present principles. As depicted in the embodiment of FIG. 3, the monocular camera $140_1$, the IMU $140_2$ and the GPS $140_3$ capture respective measurements of image features, motion and location/positioning of a platform 110 (e.g., a vehicle). For simple sensors such as the IMU $140_2$ and the GPS $140_3$, the measurement data can be communicated without processing to the inference engine 130. The IMU $140_2$ captures motion information, such as angular velocity and linear acceleration, of a respective platform 110. The GPS $140_3$ provides 3D location information such as position, velocity, and timing information of the respective platform 110.

In the embodiment of FIG. 3, the sensor processing module 121 illustratively includes a sensor array $321_1$, a sensor array converter $321_2$ and an image feature extractor (IFE) $321_3$ for pre-processing the measurements from the monocular camera $140_1$. The sensor array $321_1$ collects data from the monocular camera $140_1$. The SA converter $321_2$ transforms sensor readings into a data format defined for the CLS 100. The IFE $321_3$ detects features of the transformed monocular camera $140_1$ images. In the embodiment of FIG. 3, the pre-processed measurements are illustratively communicated to the visual odometry module 123 and the inference engine 130 of a respective navigation subsystem.

The visual odometry module 123 associates sequential video frames from a camera, such as the monocular camera $140_1$, by detecting and matching features across consecutive frames. The visual odometry module 123 tracks features from a previous frame to current frame and such information is communicated to the short-term smoother 135 of the inference engine 130 of the navigation subsystem 120. That is, IMU readings propagated from a previous pose and relative motion information determined using features tracked from a previous frame to a current frame are used by the short-term smoother 135 to estimate a pose for a respective platform. Low-latency navigation updates from the short-term smoother 135 of the inference engine 130 provide an initial estimate for slower map optimization in the long-term smoother 136 running in parallel.

In one embodiment, to find the balance between computation time and tracking performance for feature tracking, a slightly modified version of a Harris corner detector that provides a uniform and dense spread of feature points extracted from a single video frame is implemented. The feature points are extracted at three (3) levels of Gaussian pyramid built from original image to cover multiple scales. This is important for the landmark matching module 122, which matches images captured from different viewpoints or from different cameras with varied intrinsic calibration parameters (described in more detail below). In one embodiment, a Binary Robust Independent Elementary Features (BRIEF) descriptor is implemented, which provides very fast computations and correlations for matching detected features from previous frame to current frame. In one such embodiment, an average processing time takes only 15 milliseconds to track around 850 features for an image size of 640 pixels by 480 pixels, using a single core of an Intel i7 CPU running at 2.80 GHz.

The visual odometry module 123 is also capable of rejecting feature outliers using additional rigid motion constraints. For example, in one embodiment the outlier rejection module 125 of the visual odometry module 123 rejects the feature outliers. In some embodiments in accordance with the present principles, a three-layer technique is used to remove feature outliers. A first layer uses pairwise epipolar constraints across three consecutive frames to discard outlier tracked features, which are re-projected behind cameras or unrealistically close to cameras. The second layer extends the tightly-coupled visual inertial approach to improve the quality of camera feature tracking process. An IMU propagation technique is used, which predicts accurate motion during the short time period across two video frames, to guide the feature matching process and to verify the hypothesis generation through the Random sample consensus (RANSAC) process. As such, more inlier features can be generated and tracked for longer time and distance, which provide better estimates of the underlying 3D landmarks of the tracked features. The third layer leverages the inference engine 130, which stores 3D estimates of current and past tracked features from the visual odometry module 123. Coupled with geometric constraints, these 3D estimates can be used to prune outliers among new feature observations from the visual odometry module 123 and key frame candidates from the landmark matching module 122.

The valid tracked visual features then become valid measurements generated from the visual odometry module 123 to be communicated to the inference engine 130 for localization. That is, the valid measurements generated from the visual odometry module 123 are communicated to the short-term smoother 135 of the inference engine 130 of the navigation subsystem 120. Satisfactory localization can be achieved using relative measurements for short periods.

Images with detected features from the visual odometry module 123 are communicated to the landmark matching module 122. The landmark matching module 122 establishes feature associations across non-consecutive frames taken at different times. The landmark matching 122 module re-computes more powerful feature descriptors around the feature points communicated from the visual odometry module 123 and selects and stores 2D features from the images as key frames.

The landmark matching module 122 constructs the landmark database 146 using past key frames of visual features and information regarding the key frames communicated from the visual odometry module 123. The landmark matching module 122 is subsequently able to match features between a query frame and past key frames in the landmark database 146. The landmark matching module 122 establishes feature associations across non-consecutive frames taken at different times.

A key-frame represents a particular video frame, which are selected from, for example, a video stream captured by a camera, such as a monocular camera. It should be noted that in some embodiments, the query frame can also be selected as a new key-frame and be added into the database.

Various strategies for key-frame selection can be considered. In one embodiment, a strategy can include the selection of a key-frame based on a fixed time interval (such as every 1 or 0.5 seconds) or spatial interval (such as every traveled 1 or 3 meters). A more advanced strategy can include a selection based on conditions between a query frame and past key-frames, including the number of overlapped features, the temporal difference, and the spatial difference between poses associated with frames. Typically, for adding visually representative (also diverse) key-frames, the number of overlapped features should be small and the temporal difference should be large. The advantage of this technique is that it limits the growth of the landmark matching database 146 especially when traversing open spaces or the same road multiple times in which scenery does not change much.

When a new key-frame and its features are added into a database, for example the landmark database 146, the index of the database has to be dynamically reconstructed for the optimal representation of the new database. However, the computation time on reconstructing the entire index grows linearly with the total number of key-frames, which is impractical since the database will keep growing as a platform (e.g. vehicle) moves. In some embodiments, to avoid the cost in reconstructing the entire index, a collection of trees of exponentially maximal capacities is used for indexing, such as trees that hold index for features from 4, 16, 64, 256 key-frames. When new key-frames and their features are added, trees of smaller size are re-built often while large trees are rebuilt rarely by merging smaller trees. In some embodiments, the tree merging is performed on a parallel thread to support uninterrupted growth of the database. This technique enables the running time of the indexing process to be independent of the number of key-frames in the database.

The long-term smoother 136 keeps all past data which are removed (marginalized) out of the short-term smoother 135 and, as described above, can take feature associations (loop closures) from the landmark module 122 to further optimize (improve estimation of) landmark states L, which are covered by loop closures.

When platform positioning (e.g., driving) is complete, the final optimized map (including 3D landmark states L optimized by the two smoothers and their 2D position information) with the key-frame landmark database 146 built using the landmark module 122 comprise a final map. In other words, the pre-built 2D-3D landmark map and key-frame database comprise a geo-referenced map (aligned using the high-quality differential GPS).

Figure 4:
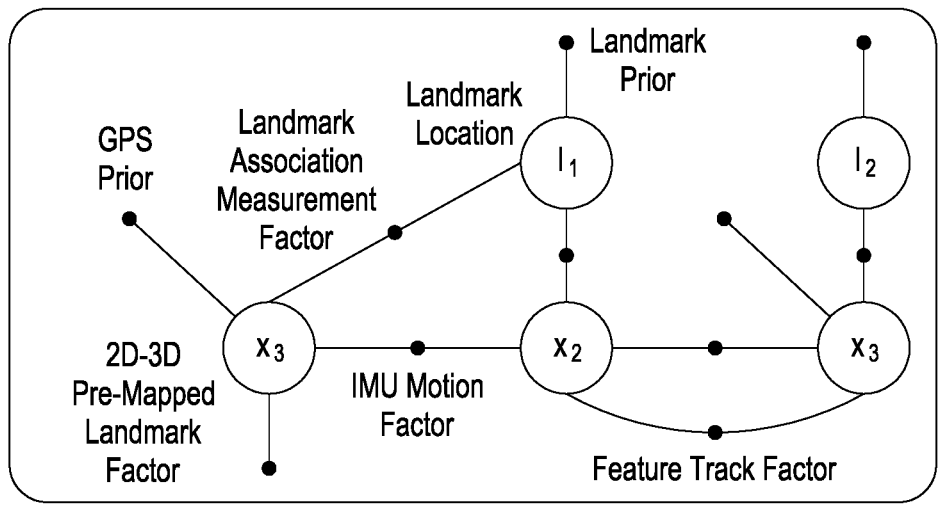
FIG. 4 depicts an exemplary factor graph able to be used in a mapping generation process or a navigation process or a simultaneous localization and mapping process of the CLS of FIG. 1 in accordance with an embodiment of the present principles.

The inference component of the present principles can be represented as a factor graph. Factor graphs are highly flexible and adaptable to any sensor configuration and enable a rapid switching of different sensor combinations and provides a framework for robust localization even through sensor noise and dropouts (i.e., vision-impaired environment, buildings, or urban canyons). FIG. 4 depicts an exemplary factor graph able to be used in a mapping generation process or a navigation process or a simultaneous localization and mapping process of the CLS 100 of FIG. 1 in accordance with an embodiment of the present principles. The factor graph of FIG. 4 illustratively comprises three navigation states and two landmark states. In the factor graph of FIG. 4, factors are formed using measurements from, for example, GPS, IMU, feature tracks, and pre-mapped landmark observations. It should be noted however, that in the mapping process in accordance with the present principles, there are no 2D-3D pre-mapped landmark factors available although depicted in FIG. 4.

A factor graph is a bipartite graph model comprising two node types: factors $f_i \in F$ and state variables $\theta_j \in \Theta$. Sensor measurements $z_k \in Z$ are formulated into factor representations, depending on how a measurement affects the appropriate state variables. For example, a GPS position measurement only involves a navigation state, x, at a single time. A camera feature observation can involve both a navigation state, x, and a state of unknown 3D landmark position, l. Estimating both navigation states and landmark positions simultaneously is consistent with simultaneous localization and mapping (SLAM) problem formulation, which is also known as bundle adjustment in computer vision. The inference process of such a factor graph can be viewed as minimizing the non-linear cost function according to equation one (1), which follows:

$$\sum_{k=1}^{K} \|h_k(\Theta_{jk}) - z_k\|_{\Sigma}^2 \quad (1)$$

whereas $h(\Theta)$ is a measurement function and $\|\cdot\|_{\Sigma}^2$ is the Mahalanobis distance with covariance $\Sigma$.

To solve the inference component for the mapping process, the estimation is split into a fast short-term smoother and a slower long-term smoother. The short-term smoother 135 reconstructs 3D landmarks using tracked visual features from the visual odometry module 123 and provides initial estimates with low latency to the long-term smoother 136. In one embodiment in accordance with the present principles, the short-term smoother 135 of the inference engine 130 uses a moving temporal window of measurements to solve for the localization solution in real-time. This approach is significantly superior to the traditional filtering methods such as Extended Kalman filters.

For the short-term smoother 135, high-frequency IMU data is formulated as an underlying motion model based on an error-state IMU propagation mechanism. This avoids the assumption of any specific dynamic model of complex kinematics (such as constant velocity) associated with humans for estimation, and instead uses derived IMU motion for human dynamics. This technique is extremely useful when tracking the navigation state of fast moving people, small drones, ground vehicles on rocky terrain, etc. Unlike traditional filtering methods, the IMU formulation in accordance with the present principles is part of the full non-linear optimization "smoothing" process. The value of IMU integration changes during re-linearization for iterative optimization, which works better for human motion such as running, climbing, crawling etc.

The long-term smoother 136 evaluates measurements over a longer time period to exploit longer range constraints for improved accuracy. In some embodiments, however, this does not run in real-time. The long-term smoother 136, which is capable of keeping all past states, processes expensive loop closures identified using the landmark matching module 122. This technique enables a real-time mapping pipeline by fully optimizing the map of 2D-3D landmarks using both smoothers.

By combining the two smoothers in a single framework, improved accuracy is able to be obtained in real-time. In some embodiments, the inference module 130 provides low-latency navigation updates while calculating the full, optimal trajectory by splitting the estimation into two tasks. The short-term smoother 135 uses data from the moving temporal window (e.g., the past eight (8) seconds) to provide the best navigation solution with minimal latency for rapid response, while the slower long-term smoother 136 estimates the platform very precisely for global consistency.

Figure 5:
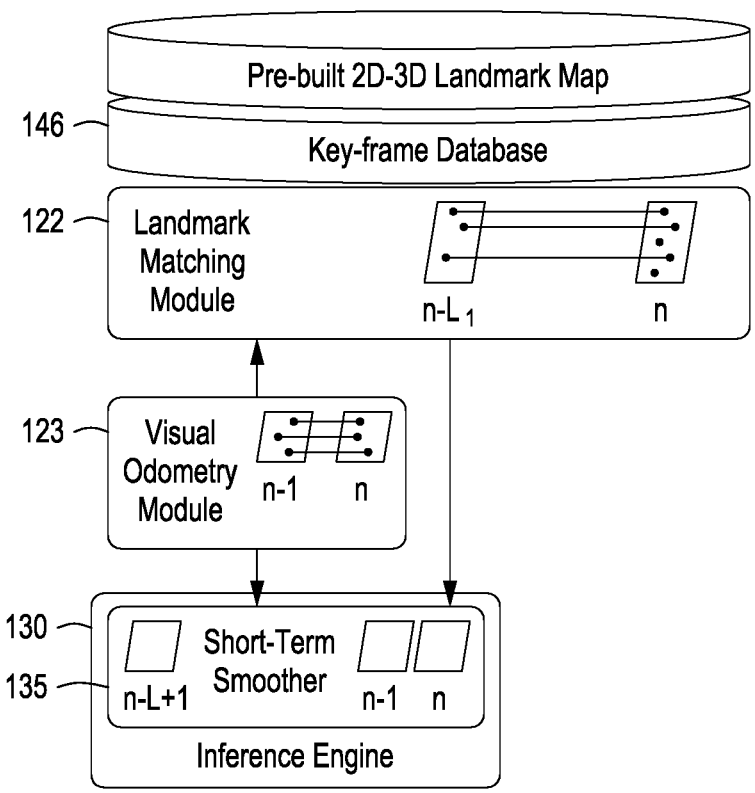
FIG. 5 depicts a functional block diagram of a navigation process using a pre-built geo-referenced database and map capable of being implemented by each of the platforms of the CLS of FIG. 1 in accordance with an embodiment of the present principles.

The CLS 100 in accordance with the present principles is able to achieve high-precision GPS-denied navigation accuracy using the pre-built map including pre-mapped visual landmarks. FIG. 5 depicts a functional block diagram of a navigation process capable of being implemented by each platform 110 of the CLS 100 of FIG. 1 in accordance with an embodiment of the present principles. Compared to the mapping process, illustrated in FIG. 3, the navigation process of FIG. 5 is simplified for pure localization, without the need for simultaneous map construction.

In the navigation process depicted in FIG. 5, the visual odometry module 123 tracks features from previous frame to current frame, and provides feature track measurements to the short-term smoother 135 of the inference engine 130 for tightly-coupled visual-inertial fusion. For new 2D features on the input frame from the visual odometry module 123, the landmark matching module 122 searches the pre-built key-frame database 146, with 2D-3D pre-mapped landmarks/features, and checks whether there are feature associations between the new video frame and past key-frames.

During a time when a match between a current feature and a stored, mapped feature does not exist, the inference engine 130 of the CLS 100 predicts the pose of a platform at a current time using IMU readings propagated from a previous pose and relative motion information using features tracked from previous frame to current frame tracked by the visual odemetry module 123.

If a current feature matches a stored, mapped feature, the inference engine 130 of the CLS 100 determines a pose for the platform device using location information of the matched, stored feature in addition to IMU readings propagated from a previous pose and relative motion information using features tracked from previous frame to current frame tracked by the visual odemetry module 123. That is, in such embodiments, the inference engine 130 uses the 2D-3D constraints of the matched, stored feature to generate global position and orientation estimates.

The identified associations are treated as pre-mapped landmark/feature observations, which provide global corrections for the inference engine 130. In accordance with the present principles, each new observation of a pre-mapped visual landmark (feature) is treated as a single measurement for computing a pose measurement. This technique tightly incorporates geo-referenced information into landmark measurements, and is capable of propagating precise 3D global pose estimates for longer periods in a GPS-denied setting. It is also more robust in places where only few or no pre-mapped landmarks are available due to scene occlusion or changes. 3D global pose can be continuously estimated by tightly fusing data from the IMU $140_2$, local tracked features from the monocular camera $140_1$, and global landmark points from associations between new observed features and pre-mapped visual landmarks.

In some embodiments, both, the simultaneous localization and mapping process (FIG. 3) and the navigation process (FIG. 5), rely on a tightly-coupled approach to fuse IMU data and monocular feature detection measurements. Inertial measurements from the IMU are produced at a much higher rate than feature detection of the cameras. To fully utilize high-frequency IMU data, in some embodiments, a single binary factor (black factors in FIG. 4) is implemented to summarize multiple consecutive inertial measurements between two navigation states created at the time when other sensor measurements (such as features from a video frame) are received. This IMU factor generates six (6) degrees of freedom relative pose and corresponding velocity change as the motion model. The IMU-specific bias is also tracked as part of the state variables for estimating motion. It is used instead of traditional process models in both the mapping process and navigation process described above. The IMU motion factor is part of the non-linear optimization process. The value of IMU integration changes during re-linearization for iterative optimization.

With respect to searches of the landmark database 146, for an input frame, extracted features are passed from the visual odometry module 123 to the landmark matching module 122 to search the landmark database 146. The maintained landmark database 146 enables the detection of loop closures. For example, if a query frame is matched to a key-frame that has been previously added to the landmark database 146 during a specific period of time, the matched key-frame is very likely to have been acquired when a platform (e.g., a vehicle) previously traversed the same location. Therefore, such matches can be considered as loop closures to optimize all poses and landmarks involved within the loop traversed. Those feature associations/loop closures are communicated to the inference engine 130. That is, loop closures are utilized in the long-term smoother 136 for slower map optimization. The landmark matching module 122 can construct the landmark database 146 on the fly or can be used to search a previously constructed landmark database 146.

In one exemplary embodiment, for visual features, HOG descriptors are re-computed for the Harris corners detected in the visual odometry module 123. Compared to BRIEF descriptors used in the visual odometry module 123, HOG descriptors are slower to be computed and to be matched. However, due to richer descriptor structure and rotation invariance, HOG descriptors perform significantly better than BRIEF descriptors when matching across non-sequential frames taken from different viewpoints, which is a more challenging task than matching across sequential frames.

In one embodiment in accordance with the present principles, a self-matching test is performed by, for example the landmark matching module 122, to select only distinctive features to search the landmark database 146. For each feature on the input frame, this test matches the feature itself to all features on the frame. It finds the best match, which would be the feature itself since descriptors are identical, and a second best match. The second best match error will be high if the feature is distinctive. Using a simple threshold on the second best match error enables the removal of non-distinctive features from the input frame. This technique improves the performance of the entire search process and also reduces the computation time and database size, which is proportional to the number of features.

In one embodiment, the database search is based on efficient Fast Library for Approximate Nearest Neighbors (FLANN) which searches in high-dimensional tree structure (e.g., randomized KD-forest, a collection of KD-trees). The result is that the K best feature matches are found, which reveal possible key-frame candidates. All valid feature associations from the key-frame candidate with the most inliers serve as final measurements generated from the landmark matching module 122.

Each observation of the pre-mapped visual landmark returned from the landmark matching module 122 represents a correspondence between a new 2D feature from a current video frame and a pre-mapped 2D-3D landmark in the pre-built map. The navigation state for a given time is defined as x=Π, v, b (FIG. 4). Each state, x, represents three blocks: pose block, Π, includes 3d translation, t (body in global) and 3d rotation, R, (global to body), velocity block, v, represents 3d velocity, and b denotes sensor-specific bias. To simplify the notation, it can be assumed that all sensors have the same center, which is the origin of the body coordinate system. Since 3D estimates of pre-mapped landmarks are already fully optimized, the uncertainty of the landmarks is converged and small. The estimated 3D location of a pre-mapped landmark is considered as a fixed quantity (3D point) with the estimated uncertainty from the map in the global coordinate system. This fixed 3D point, q, is transformed to the body coordinate system as $m=[m_1\ m_2\ m_3]^T$, based on rotation, $R_j$, and translation, $t_j$, in state, $X_j$, to generate a unary factor (orange factor in FIG. 4) with the following measurement model according to equations two (2) and three (3), which follow:

$$z = h(X_j) + n = f(m) + n = f(R_j(q - t_j)) + n \qquad (2)$$

$$f(m) = f([m1, m2, m3]) = \left[\frac{m_1}{m_3}, \frac{m_2}{m_3}\right] \qquad (3)$$

where n is the noise and $f(m)$ is the function that projects m into the normalized 2D imaged point. The Jacobian of the measurement z with respect to $R_j$ and $t_j$ from $X_j$ is calculated according to equations four (4), five (5) and six (6), which follow:

$$\delta z \simeq G\delta X_j \quad (4)$$

$$G = M([R_j(q - t_j)]_x \delta R_j - R_j \delta t_j) \quad (5)$$

$$M = \begin{bmatrix} \frac{1}{m^3} & 0 & \frac{-m_1}{m_3^2} \\ 0 & \frac{1}{m^3} & \frac{-m_2}{m_3^2} \end{bmatrix} \quad (6)$$

In some embodiments, the above factor formulation is applied to all pre-mapped landmark observations which are identified through feature correspondences between a stored key frame and a current frame. These unary factors (orange factors in FIG. 4) provide immediate absolute information to update location estimation.

To solve the inference component for the GPS-denied navigation process (i.e., no green factors for GPS measurements in FIG. 4), the inference component is simplified as a pure localization process. In the navigation process, only the short-term smoother is used for inference, which supports non-linear optimization over a sliding constant-length window and efficiently removes states that are outside of the window.

In some embodiments in accordance with the present principles, the optional ranging radio 144 can be implemented to provide location/position information to, for example, the inference engine 130, to provide corrections for navigational information determined by the inference engine 130. For example, ranging to nodes with known positions provides absolute measurements which could constrain a drift and improve a performance of the CLS 100 of FIG. 1. For example, static nodes with known positions (i.e. robots stationed strategically) provide an "Anchor Effect" to bound absolute navigation error. The ranging radio 144 can also be implemented to share position and range information among the plurality of platforms 110.

In addition, in some embodiments in accordance with the present principles, the optional geo-reference matcher module 124 can be implemented to match features observed from cameras carried by, for example, UAVs, UGVs or other platforms to render world landmarks, skyline and other such reference imagery, terrain maps (e.g., Digital Terrain Elevation Data (DTED) or Light Detection and Ranging (LIDAR)) and possibly site models from prior geo-referenced 2D and 3D databases (not shown). These feature matches generate 3D-2D geo-registration constraints as strong absolute measurements to reset a drift. Such geo-registration is able to greatly improve navigation results and maintains high navigation accuracy.

In alternate embodiments in accordance with the present principles, a monocular camera and IMU, such as monocular camera $140_1$, the IMU $140_2$ of FIG. 3, can be replaced with a stereo camera (not shown). That is, a stereo camera captures visual features with depth information from the perceived environment, while monocular camera needs other sensors such as IMU to recover scale in pose estimation. Therefore, IMU intrinsic calibration (such as accelerometer noise) is important for scale estimation for navigation with monocular cameras. Motion estimation using stereo camera can be more robust, because features matched between left and right views are further validated using stereo constraints. However, there are also fewer and shorter features tracked from stereo cameras due to more stringent constraints. Although, monocular cameras typically match more and longer features between consecutive frames, equipping a platform 110 with stereo cameras provides a more powerful sensor choice than a monocular camera due to better robustness and scale estimation.

In an alternate embodiment in accordance with the present principles, features from two single cameras (e.g., two monocular cameras) are tracked individually and their stereo associations are identified. An advantage to such a configuration is that the navigation works even when one camera is occluded or mal-functioning, by supplying monocular tracks from the other, working camera. In one embodiment, features for left and right monocular cameras are tracked respectively, and stereo correspondences between the left and right monocular cameras are identified. The data from the left and right monocular cameras can then be applied as if applying data from an ordinary stereo camera.

The architecture of the CLS 100 of, for example, the embodiment of FIG. 1, supports distributed and asynchronous collaborative navigation through at least two independent methods of inter-node constraints (described in greater detail below). The first method uses ranging radios 144 to obtain ranging data across platforms, proving additional constraints to the inference engine 130 to iteratively estimate an improved localization. The CLS 100 opportunistically shares local navigation estimates (having associated confidences) and inter-platform ranging information with other platforms 110. As information from more nodes (platforms) is integrated together, the inference engine 130 can exploit collaborative teamwork, reset, and anchor effects.

In the second method the landmark matching database 146 is constructed on the fly during navigation, to be distributed across nodes enabling the exploitation of landmark data of other platforms collaboratively for better localization. Inter-node constraints based on past visual observations are shared across nodes for further reasoning and optimization. Visual landmarks provide a mechanism for re-acquiring and improving estimations of position and orientation of a platform, based on past observation from other platforms. The collaborative navigation with landmark sharing in accordance with the present principles can be defined as collaborative navigation using unidirectional landmark sharing, and collaborative navigation using bidirectional landmark sharing.

In one embodiment of unidirectional landmark sharing, a leader platform with a high-quality IMU, continuously builds and shares an optimized map and a dynamic landmark database during navigation. A follower platform with a low-quality MEMs IMU is able to get comparable GPS-denied navigation accuracy as the leader vehicle by receiving 2D-3D visual landmarks in real time from the leader platform. The 2D-3D visual landmarks from the leader platform provide high-quality absolute measurements to "re-set" the follower platform in the spatial coordinate through feature associations across images captured from the leader and the follower respectively.

In some embodiments of collaborative navigation using bidirectional landmark sharing, landmark data can be shared across platforms 110. In such embodiments, data from a local landmark database 146 can be shared with different platforms 110 using, for example, the respective data radio 142. The shared data can be received by the different platforms 110 using for example the respective data radio 142 and integrated into a local landmark database 146. As such, a local landmark matching module 122 can attempt to match 2D features sent from other platforms and 2D features of a local landmark database 146 to 2D features on images perceived at the current platform 110. The current platform 110 can utilize 3D landmarks with the found 2D features associations to improve a navigation solution determined by the inference engine 130.

Alternatively or in addition, data from a local landmark database 146 can be shared with a global landmark database (not shown) using, for example, the respective data radio 142. The shared data can be integrated into a global landmark database (not shown). The global landmark database (not shown) can be accessed by each of the respective landmark matching modules 122 of the platforms 110. As such, each of the respective landmark matching modules 122 of the platforms 110 can attempt to match 2D features in the global landmark database to respective 2D features on images perceived at the platform 110. Each of the platforms 110 can utilize 3D landmarks with the found 2D features associations to improve a navigation solution determined by a respective inference engine 130. Alternatively or in addition, in such an embodiment, a global landmark matching module (not shown) can be implemented to process the data in the global landmark database (not shown) to attempt to match 2D features in the global landmark database to respective 2D features on images shared from a specific platform 110. The global landmark matching module (not shown) can share information regarding 3D landmarks associated with the 2D feature associations with the specific platform 110 having shared the images to improve a navigation solution determined by a respective inference engine 130 of the specific platform 110.

Figure 6:
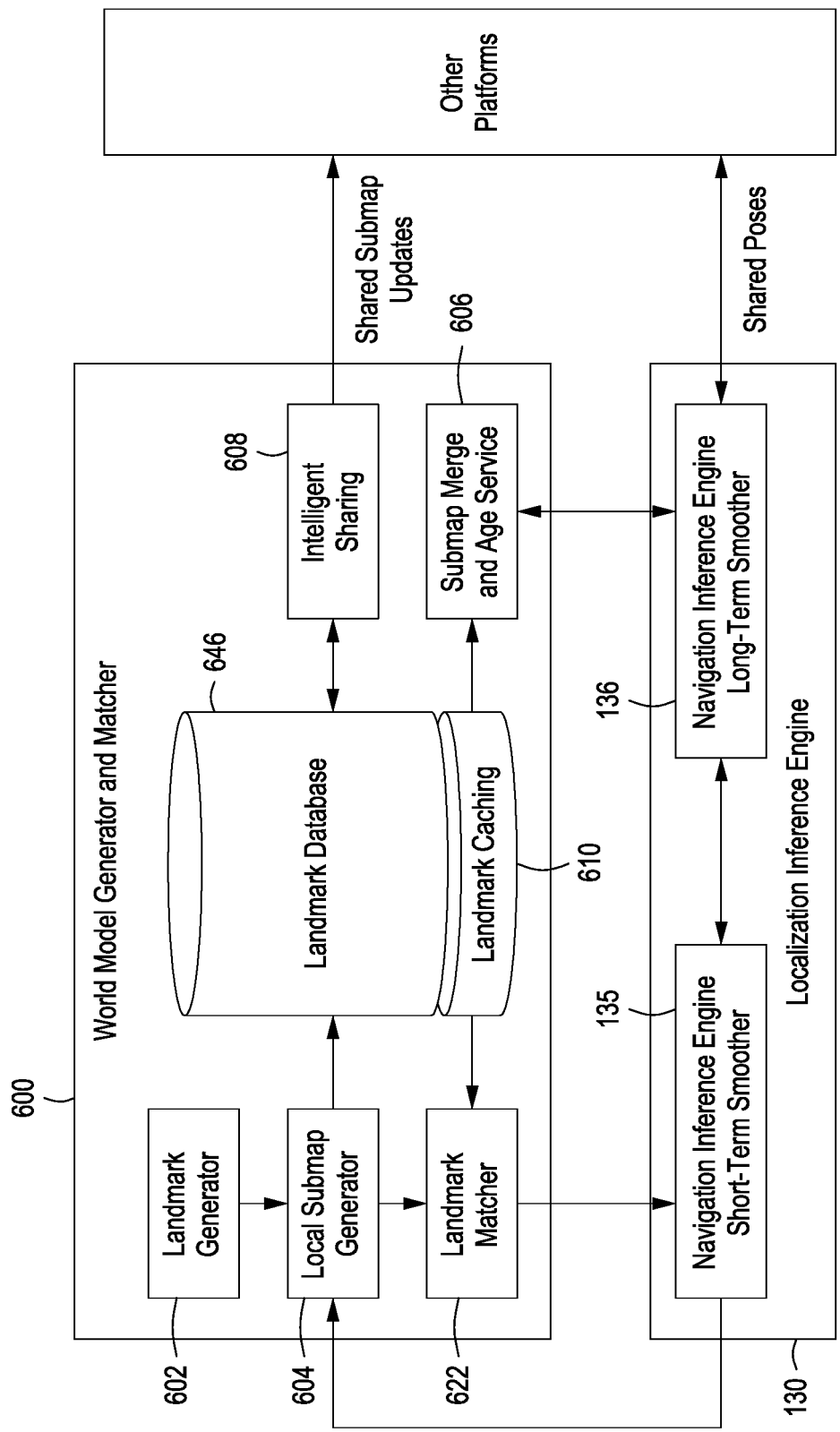
FIG. 6 depicts a high level block diagram of a World Map Updating Architecture in accordance with an embodiment of the present principles.

In some embodiments in accordance with the present principles, the global landmark database previously described can comprise a world map. FIG. 6 depicts a high level block diagram of a World Map Updating Architecture in accordance with an embodiment of the present principles. A world model map generator and matcher module 600 consists of collection of sub modules that allows for dynamic multi-user generation, consumption and updates of the world map. The landmark generator module 602 takes active sensors data and generates landmark features.

While active developments of landmarks have been based on visual sensors, the concepts generalize to high-level features that are extracted from any sensor and can be matched to geo-locate or locate you within the map. These features over time are connected in space based on the navigation output to create locally consistent sub-maps using, for example, the local sub-map generator module 604. These sub-maps are then stored in a map/landmark database 646 for consumption by the landmark matcher module 622. The landmark matcher module 622 takes the current landmarks extracted from the live sensors and correlates it to the map/landmark database 646 to create new map-based constraints for the inference engine 130.

As the world map grows that shear amount of data will make it impossible to maintain the whole map in memory. Intelligent geo-spatial caching of the map data by, for example the landmark caching module 610, is required to bring in relevant parts of the world map into a memory from storage as a platform moves within the world map. It is not enough to have the visual landmark caching to achieve efficient matching. Within in-core cache there still can be significant amount of landmark features for which a linear search can be highly inefficient. Visual feature indexing methods such as visual codebooks or visual feature hash tables need to be generated and stored within the cache infrastructure for efficient data access and matching.

As the sub-maps are generated and added to the world map, different parts of the map can become inconsistent and disjointed. Similarly these sub-maps can have significant duplications. As the time between sub-maps grows, parts of the map become outdated as the world around the user changes. The sub-map merge & age service module 606 reasons across multiple sub-maps to find common constraints and make these consistent within the world map coordinate system. It uses the long-term smoother 136 of the inference engine 130 to make these sub-maps consistent. When the sub-maps are merged, the inference engine 130 will also evaluate feature distribution of the merged map and identify (i) duplicated landmarks, (ii) aged landmarks and (iii) multiple representations of landmarks for the same location that account for variations that may be observed. The system will use this criterion to create a compressed merged representation that is ready for real-time consumption.

The intelligent sharing module 608 determines which of the sub-maps/landmarks should be shared with other platforms/users. As the maps are revisited over and over again many times, most locations would have been mapped before. By comparing the richness of matches and what is new, what is transmitted or shared with others can be limited. In addition to looking for overlaps with what is in the database to prune sharing, saliency of the landmarks can be used for additional pruning. Saliency is defined, as features that are believed to stay constant within the map (i.e., if landmarks/features are found while in motion on a vehicle, as the vehicle continues to move, the previously found landmarks/features would not remain valid within the map; hence, such non-salient features can be removed from the database and transmission).

In some embodiments, to maintain the fully-optimized visual map, each platform 110 updates and shares 3D visual landmarks based on a three-stage modeling of visual landmarks. The first stage is for new initialized landmarks, which correspond to new observed scene features. These landmarks don't exist in the shared visual map before, and need to be sent across multiple platforms by automatic broadcast for adding into the shared map. The second stage is for existing landmarks without full optimization. New 2D observations of these landmarks with updated 3D information (if exists) from any platform need to be shared across other platforms, for further optimizing the shared map. The third stage is for matured landmarks. These landmarks are already fully optimized with sufficient 2D observations in the map. The uncertainties of these landmarks are small and converged. They can be used directly for any platform to perform global corrections in the navigation estimation. The platform does not need to send any new 2D observations or updated 3D values for these landmarks across the network. Using this technique, bandwidth and network usage for collaborative navigation is saved. All platforms could allocate computation resource to process and to optimize only immature landmarks, which are in the first two stages, for efficient collaborate navigation while maintaining a shared dynamic map.

The sharing of data as described above, leads to instances in which a same scene/feature is observed from different viewing angles at different time instants. By viewing the same landmark from different angles and distances across different platforms, loop-closure constraints can be formed without a same platform re-visiting the same location. In accordance with embodiments of the present principles, data can be shared and transmitted through any wireless mechanisms/networks across different platforms.

Figure 7:
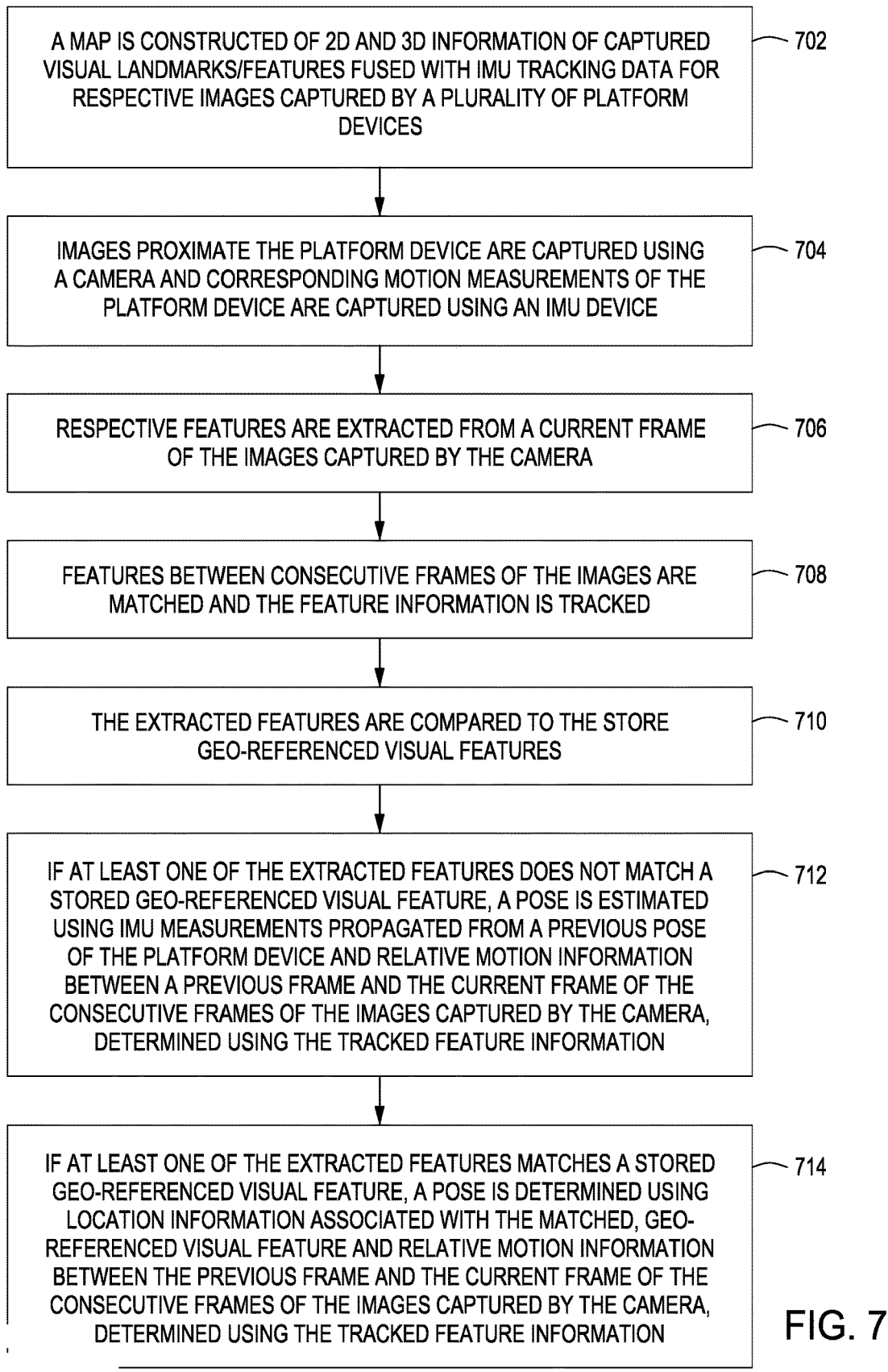
FIG. 7 depicts a flow diagram of a method for collaborative navigation and mapping in accordance with a general embodiment of the present principles.

FIG. 7 depicts a flow diagram of a method for collaborative navigation and mapping in accordance with a general embodiment of the present principles. The method 700 begins at step 702 during which a map is constructed of 2D and 3D geo-referenced visual features associated with IMU tracking data for respective images captured by a plurality of platform devices. As described above, in one embodiment, to generate a geo-referenced map measurements from an IMU, a GPS and camera are collected for each platform. Features of the images collected by the camera are extracted. The respective GPS and IMU measurements are associated and stored with selected features along with a pose estimation for the selected features. The method 700 can proceed to 704.

At 704, during GPS-denied or restricted navigation, respective images are captured by a camera and corresponding motion measurements for each of the plurality of platform devices are captured by a respective IMU device. The method 700 can proceed to 706.

At 706, respective features are extracted from a current frame of the images captured by the camera for each of the plurality of platform devices. The method 700 can proceed to 708.

At 708, features between consecutive frames of the images are matched and the feature information is tracked. The method 700 can proceed to 710.

At 710, the respective extracted features are compared to stored geo-referenced visual features for each of the plurality of platform devices. If at least one of the extracted features do not match a stored geo-referenced visual feature, the method 700 can proceed to step 712. If at least one extracted feature matches a stored geo-referenced visual feature, the method 700 can proceed to step 714.

At 712, a respective pose for each of the plurality of platform devices is estimated using IMU measurements propagated from a previous pose of the platform device and relative motion information between a previous frame and the current frame of the consecutive frames of the images captured by the camera, determined using the tracked feature information. The method 700 can be exited.

At step 714, a respective pose for each of the plurality of platform devices is determined using location information associated with the matched, geo-referenced visual feature and relative motion information between the previous frame and the current frame of the consecutive frames of the images captured by the camera, determined using the tracked feature information. The method 700 can be exited.

FIG. 8 depicts a simplified high level block diagram of an embodiment of the computing device 800 in which a navigation subsystem 120 can be implemented in accordance with an embodiment of the present principles. While the computing device 800 is shown as involving multiple components and devices, it should be understood that in some embodiments, the computing device 800 can constitute a single computing device (e.g., a mobile electronic device, laptop or desktop computer) alone or in combination with other devices.

The illustrative computing device 800 can be in communication with one or more other computing systems or devices 842 via one or more networks 840. In the embodiment of FIG. 8, illustratively, a portion 120A of a navigation subsystem 120 can be local to the computing device 800, while another portion 120B can be distributed across one or more other computing systems or devices 842 that are connected to the network(s) 840. Similarly, a portion 146A of the illustrative landmark database 146 can be local to the computing device 800 while another portion 146B can be distributed across one or more of the other computing systems or devices 842. In other embodiments, however, the navigation subsystem 120 and/or the landmark database 146 can be located entirely on a single computing device. In some embodiments, portions of the navigation subsystem 120 can be incorporated into other systems or interactive software applications. Such applications or systems can include, for example, operating systems, middleware or framework software, and/or applications software. For example, portions of the navigation subsystem 120 can be incorporated into or accessed by other, more generalized search engine(s) or intelligent assistance applications.

The illustrative computing device 800 of FIG. 8 includes at least one processor 812 (e.g. a microprocessor, microcontroller, digital signal processor, etc.), memory 814, and an input/output (I/O) subsystem 816. The computing device 800 can be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices.

Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 can be embodied as any type of suitable computer memory device (e.g., volatile memory such as various forms of random access memory). In the embodiment of FIG. 8, the I/O subsystem 816 is communicatively coupled to a number of hardware components and/or other computing systems including one or more user input devices 818 (e.g., a touchscreen, keyboard, virtual keypad, microphone, etc.), and one or more storage media 820.

The storage media 820 may include one or more hard drives or other suitable data storage devices (e.g., flash memory, memory cards, memory sticks, and/or others). In some embodiments, portions of systems software (e.g., an operating system, etc.), framework/middleware (e.g., application-programming interfaces, object libraries, etc.), the navigation subsystem 120A, and/or the landmark database 146A reside at least temporarily in the storage media 820. Portions of systems software, framework/middleware, the navigation subsystem 120 and/or the landmark database 146 can also exist in the memory 814 during operation of the computing device 800, for faster processing or other reasons.

The one or more network interfaces 832 can communicatively couple the computing device 800 to a local area network, wide area network, a personal cloud, enterprise cloud, public cloud, and/or the Internet, for example. Accordingly, the network interfaces 832 can include one or more wired or wireless network interface cards or adapters, for example, as may be needed pursuant to the specifications and/or design of the particular computing device 800.

The other computing device(s) 842 can be embodied as any suitable type of computing device such as any of the aforementioned types of devices or other electronic devices. For example, in some embodiments, the other computing devices 842 can include one or more server computers used to store portions of the navigation subsystem 120B and/or the landmark database 146B.

The computing device 800 can include other components, subcomponents, and devices not illustrated in FIG. 8 for clarity of the description. In general, the components of the computing device 800 are communicatively coupled as shown in FIG. 8 by signal paths, which may be embodied as any type of wired or wireless signal paths capable of facilitating communication between the respective devices and components.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the teachings can be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for case of discussion, and are not intended to imply that any specific implementation details are required. For example, any of the described modules and/or data structures may be combined or divided into sub-modules, sub-processes or other units of computer code or data as may be required by a particular design or implementation of the CLS 100. Further, references herein to rules or templates are not meant to imply any specific implementation details. That is, the CLS 100 can store rules, templates, etc. in any suitable machine-readable format.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the teachings herein.

While the foregoing is directed to embodiments in accordance with the present principles, other and further embodiments in accordance with the principles described herein may be devised without departing from the basic scope thereof, and the scope thereof is determined by the claims that follow.

The invention claimed is:

1. A collaborative navigation and mapping subsystem for determining a pose of a platform device, the collaborative navigation and mapping subsystem comprising one or more non-transitory machine accessible storage media and comprising instructions executable by one or more processors to cause a computing system to:
   construct a map of 2D and 3D geo-referenced visual features associated with inertial measurement unit (IMU) tracking data for respective images captured by a plurality of platform devices;
   during GPS-denied or GPS-restricted navigation, capture images proximate the platform device using a camera and capture corresponding motion measurements of the platform device while capturing the images;
   extract visual features of the images captured by the camera during GPS-denied or GPS-restricted navigation;
   match the extracted visual features and track feature information between the images captured by the camera during GPS-denied or GPS-restricted navigation;
   compare the extracted visual features of the images captured by the camera during GPS-denied or GPS-restricted navigation to the mapped, geo-referenced visual features;
   if at least one of the extracted visual features of the images captured by the camera during GPS-denied or GPS-restricted navigation does not match a mapped, geo-referenced visual feature, determine a current pose for the platform device using pose information associated with a geo-referenced visual image previously captured by the camera of the platform device and relative motion information of the platform device since the capture of the previously captured, geo-referenced visual image, wherein the relative motion is determined using the captured, corresponding motion measurements; and
   if at least one of the extracted visual features of the images captured by the camera during GPS-denied or GPS-restricted navigation matches a mapped, geo-referenced visual feature, determine a current pose for the platform device using pose information associated with the matched, mapped, geo-referenced visual feature and relative motion information of the platform device since the capture of the matching, extracted visual feature, wherein the relative motion is determined using the captured, corresponding motion measurements.

2. The collaborative navigation and mapping subsystem of claim 1, wherein constructing the map comprises:
   for each of a plurality of platform devices:
      capturing respective images proximate the platform device using a respective camera;
      extracting respective visual features for the captured images;
      capturing corresponding motion measurements of the platform device during the image capture using a respective IMU device;
      capturing respective GPS measurements for each of the extracted features; and
      determining and storing a respective pose for each of the extracted features using the IMU and GPS measurements.

3. The collaborative navigation and mapping subsystem of claim 1, wherein the pose is determined for the platform device using a short-term smoother and a long-term smoother.

4. The collaborative navigation and mapping subsystem of claim 1, wherein at least one of feature information for each of the extracted and mapped visual features, IMU measurements for each of the extracted and mapped visual features, and pose information for each of the extracted and mapped visual features is shared among at least two of the plurality of platform devices.

5. The collaborative navigation and mapping subsystem of claim 1, wherein a match between at least one of the extracted features and at least one of the mapped geo-referenced visual features is used to establish a loop closure.

6. A collaborative localization system, comprising:
a plurality of platform devices, each of the platform devices comprising:
  a data radio to share visual feature and pose information among at least two of the plurality of platform devices;
  a camera to capture images associated with a location of the platform device;
  a GPS to capture position information of the platform device;
  an inertial measurement unit (IMU) to capture motion information of the platform device;
  a collaborative navigation and mapping subsystem comprising one or more non-transitory machine accessible storage media and comprising instructions executable by one or more processors to cause a computing system to:
    construct a map of 2D and 3D geo-referenced visual features associated with IMU tracking data for respective images captured by the plurality of platform devices;
    during GPS-denied or GPS-restricted navigation, capture images using the camera and capture corresponding motion measurements of the platform device using the IMU device while capturing the images;
    extract visual features of the images captured by the camera during GPS-denied or GPS-restricted navigation;
    match the extracted visual features and track feature information between the images captured by the camera during GPS-denied or GPS-restricted navigation;
    compare the extracted visual features of the images captured by the camera during GPS-denied or GPS-restricted navigation to the mapped geo-referenced visual features;
    if at least one of the extracted visual features of the images captured by the camera during GPS-denied or GPS-restricted navigation does not match a mapped geo-referenced visual feature, determine a current pose for the platform device using pose information associated with a geo-referenced visual image previously captured by the camera of the platform device and relative motion information of the platform device since the capture of the previously captured, geo-referenced visual image, wherein the relative motion is determined using the captured, corresponding motion measurements; and
    if at least one of the extracted visual features of the images captured by the camera during GPS-denied or GPS-restricted navigation matches a mapped geo-referenced visual feature, determine a current pose for the platform device using pose information associated with the matched, mapped geo-referenced visual feature and relative motion information of the platform device since the capture of the matching, extracted visual feature, wherein the relative motion is determined using the captured, corresponding motion measurements.

7. The collaborative localization system of claim 6, wherein the collaborative navigation and mapping subsystem comprises:
a visual odometry module to match features and track feature information between a previous frame and the current frame of the images captured by the camera;
a landmark matching module to compare the extracted features to the stored geo-referenced visual features; and
an inference module to determine the pose for the platform device.

8. The collaborative localization system of claim 7, wherein the inference module comprises:
a short-term smoother to provide initial pose estimates;
a long-term smoother to provide slower pose estimates for visual features of the map;
an outlier rejection module to evaluate a quality of data from sensors to an expected performance and to an estimated navigation solution; and
a sensor selection module which receives data from the outlier rejection module to automatically select sensors that gives a best navigation solution.

9. The collaborative localization system of claim 7, wherein the collaborative navigation and mapping subsystem comprises:
a sensor processing module to pre-process sensor measurements to be communicated to the inference module.

10. The collaborative localization system of claim 6, wherein the camera comprises at least one of a stereo camera and a monocular camera.

11. The collaborative localization system of claim 6, comprising sensors including at least one of a barometer, odometer and magnetometer for providing measurements to the collaborative navigation and mapping subsystem for determining a pose for a respective platform.

12. A method for determining a pose of a platform device, comprising:
during GPS-denied or GPS-restricted navigation, capturing images proximate the platform device using a camera and capturing corresponding motion measurements of the platform device while capturing the images;
extracting visual features of the images captured by the camera during GPS-denied or GPS-restricted navigation;
matching extracted visual features and tracking feature information between the images captured by the camera during GPS-denied or GPS-restricted navigation;
comparing the extracted visual features of the images captured by the camera during GPS-denied or GPS-restricted navigation to previously mapped geo-referenced visual features from a plurality of platform devices;
if at least one of the extracted visual features of the images captured by the camera during GPS-denied or GPS-restricted navigation does not match a mapped geo-referenced visual feature, determining a current pose for the platform device using IMU measurements propagated from a location of a capture of a previous frame having an associated pose information associated with a geo-referenced visual image previously captured by the camera of the platform device and relative motion information of the platform device since the capture of the previously captured, geo-referenced visual image, wherein the relative motion is determined using the captured, corresponding motion measurements; and if at least one of the extracted visual features of the images captured by the camera during GPS-denied or GPS-restricted navigation matches a mapped geo-referenced visual feature, determining a current pose for the platform device using pose information associated with the matched, mapped geo-referenced visual feature and relative motion information of the platform device since the capture of the matching, extracted visual feature, wherein the relative motion is determined using the captured, corresponding motion measurements.

13. The method of claim 12, wherein the previously mapped geo-referenced visual features from a plurality of platform devices comprise a map of previously stored geo-referenced visual features and the construction of the map comprises:

for each of the plurality of platform devices:
capturing respective images proximate the platform device using a respective camera;
extracting respective visual features for the captured images;
capturing corresponding motion measurements of the platform device during the image capture using a respective IMU device;
capturing respective GPS measurements for each of the extracted features; and
determining and storing a pose for each of the extracted features using the IMU and GPS measurements.

14. The method of claim 12, comprising sharing at least one of feature information for each of the extracted and mapped visual features, measurements for each of the extracted and mapped visual features, and pose information for each of the extracted and mapped visual features is shared among at least two of the plurality of platform devices.

15. The method of claim 14, wherein a match between features of the at least two of the plurality of platform devices is used to establish a loop closure.

* * * * *